(12) United States Patent
Gundavelli et al.

(10) Patent No.: US 12,477,418 B2
(45) Date of Patent: Nov. 18, 2025

(54) HANDOVERS IN WIRELESS CONTROLLER-BASED SYSTEMS

(71) Applicant: Cisco Technology, Inc., San Jose, CA (US)

(72) Inventors: Srinath Gundavelli, San Jose, CA (US); Sudhir K. Jain, Fremont, CA (US); Indermeet S. Gandhi, San Jose, CA (US); Bahador Amiri, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 421 days.

(21) Appl. No.: 18/193,066

(22) Filed: Mar. 30, 2023

(65) Prior Publication Data
US 2024/0334275 A1 Oct. 3, 2024

(51) Int. Cl.
*H04W 36/02* (2009.01)
(52) U.S. Cl.
CPC ................... *H04W 36/023* (2013.01)
(58) Field of Classification Search
CPC .................................................. H04W 36/023
See application file for complete search history.

(56) References Cited

U.S. PATENT DOCUMENTS

| | | |
|---|---|---|
| 9,681,344 B1 | 6/2017 | Oroskar et al. |
| 2008/0192696 A1* | 8/2008 | Sachs .............. H04W 36/02 370/331 |
| 2010/0062774 A1 | 3/2010 | Motegi et al. |
| 2011/0211559 A1 | 9/2011 | Lim et al. |
| 2012/0082134 A1 | 4/2012 | Hegde et al. |
| 2023/0081286 A1* | 3/2023 | Liang ............. H04W 36/0007 370/331 |
| 2024/0214876 A1* | 6/2024 | Liu ................. H04W 36/08 |
| 2024/0244490 A1* | 7/2024 | Al .................. H04W 36/023 |

* cited by examiner

*Primary Examiner* — Hashim S Bhatti
(74) *Attorney, Agent, or Firm* — Patterson + Sheridan, LLP

(57) ABSTRACT

Techniques for performing optimized handovers of a client device between access points in wireless networks are provided. A first access point exchanges packets with a client device. The first access point receives a disassociation notice from the client device. In response to the disassociation notice, the first access point buffers one or more packets received for the client device in a first buffer. The first access point receives an indication from a controller to transmit the one or more packets in the first buffer to a second access point. In response to the indication, the first access point transmits the one or more packets in the first buffer to the second access point.

19 Claims, 11 Drawing Sheets

HANDOVERS IN WIRELESS CONTROLLER-BASED SYSTEMS

TECHNICAL FIELD

Embodiments presented in this disclosure generally relate to wireless communication. More specifically, embodiments disclosed herein relate to performing optimized handovers between access points in controller-based system.

BACKGROUND

Handover of a client device between two access points (APs) (e.g., from a source or origin AP to a new, target, or destination AP) in many wireless local area network (WLAN) systems (such as a 802.11 WLAN system) occurs under a variety of conditions, such as when a radio frequency (RF) channel currently used by the source AP is in poor condition (at least with respect to a given client), or the client device moves out of the range of the source AP and into the range of the new AP.

Conventionally, inter-AP handover of a client device between a source AP and a new AP in WLAN system is not optimal. Conventional inter-AP handovers often result in packet losses during the handover (which can be in the range of tens of milliseconds), leading to a poor end-user experience. During the inter-AP handover, there is a window of time in which the client device may experience a temporary interruption in the wireless connection (e.g., unable to receive or transmit data) as it transitions from one AP to another. This interruption may be caused by the delays in completing the link-switching from the source AP to the new AP, authentication delays, and the like. During this window of time, any downlink data that is received at the source AP will be lost. These losses of data can have a significant impact on the roaming device, and particularly on latency-sensitive applications, which are often time-critical and can require a rapid exchange of data between the involved systems. For example, Virtual Reality (VR) and Augmented Reality (AR) systems, multimedia streaming systems, video transcoding systems, multi-player network gaming systems, telesurgery systems, computerized trading systems, autonomous driving systems, and the like are often latency-sensitive.

Techniques for more optimized wireless handovers are needed.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
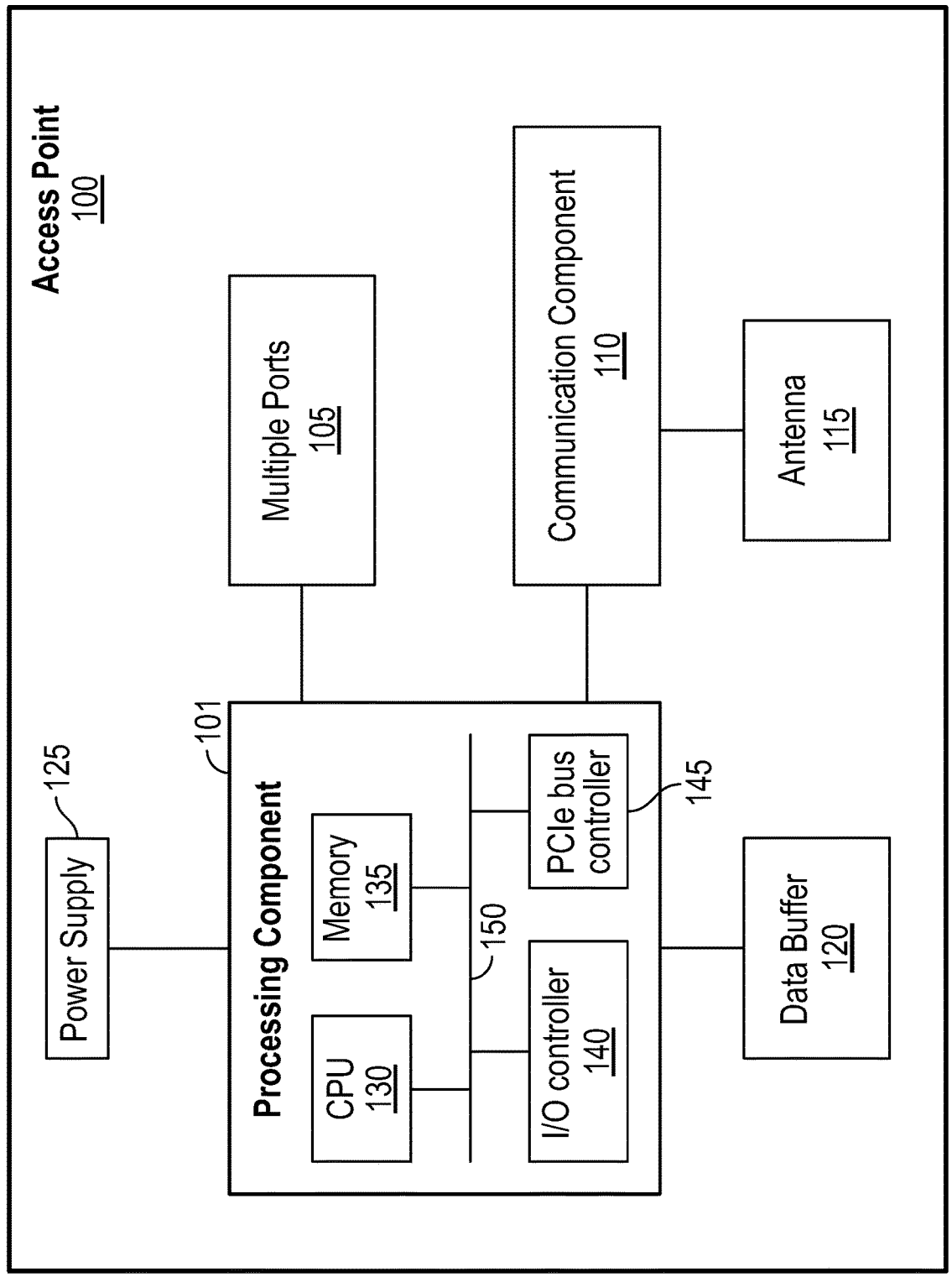
FIG. 1 depicts an example of a simplified AP architecture, according to some embodiments of the present disclosure.

One embodiment presented in this disclosure provides a method, including exchanging packets, by a first access point and with a client device, receiving, by the first access point, a disassociation notice from the client device, in response to the disassociation notice, buffering, by the first access point, one or more packets received for the client device in a first buffer, receiving, from a controller, an indication to transmit one or more packets in the first buffer to a second access point, and in response to the indication, transmitting, by the first access point, the one or more packets in the first buffer to the second access point.

Another embodiment presented in this disclosure provides a method, including receiving, by a first access point, an association request from a client device, establishing, by the first access point, an association with the client device, in response to receiving, from a controller, an indication to buffer data for the client device, buffering, by the first access point, one or more packets received for the client device in a first buffer, receiving, by the first access point and from a second access point, an indication that no additionally packets remain in a second buffer of the second access point, and in response to the indication from the second access point, transmitting, by the first access point, the one or more packets in the first buffer to the client device.

Another embodiments in this disclosure provide non-transitory computer-readable mediums containing computer program code that, when executed by operation of one or more computer processors, performs operations, including receiving, by a first access point, an association request from a client device, establishing, by the first access point, an association with the client device, in response to receiving, from a controller, an indication to buffer data for the client device, buffering, by the first access point, one or more packets received for the client device in a first buffer, receiving, by the first access point and from a second access point, an indication that no additionally packets remain in a second buffer of the second access point, and in response to the indication from the second access point, transmitting, by the first access point, the one or more packets in the first buffer to the client device.

Example Embodiments

Embodiments described herein provide techniques for performing optimized handovers of client devices between APs in a WLAN system (e.g., a WLC-based system).

In one embodiment, the first AP (also referred to in some embodiments as the origin AP or source AP) is associated with a client device. When the client device roams to a new AP, in an embodiment, the client device can transmit a disassociation notice (to the source AP) indicating its upcoming departure. In an embodiment, upon receiving the disassociation notice, the first AP can continue buffering downlink any received data that is addressed to/destined for the client device. After the transition from the first AP to the second AP (also referred to in some embodiments as the new AP, target AP or destination AP) is complete, the controller of the WLAN (e.g., the WLC) can transmit or provide, to the first AP, an indication of the new AP (to which the client device roamed) and instructing it to transmit its buffered downlink data to the second AP. This approach ensures that the downlink data addressed to the client device is buffered in the first AP (the source AP) during the inter-AP handover, and forwarded to the second AP (new AP) after the handover is complete, which can effectively prevent data losses during the process. The second AP can then forward the data (received from the first AP) to the client device, while buffering data that the second AP receives (e.g., from the controller or broader network) for the client device. Once all of the data buffered by the first AP has been forwarded, in an embodiment, the second AP can then begin forwarding its own buffered data to the client device. This ensures that the packets maintain the correct ordering and no data is lost during the transition.

FIG. 1 depicts an example of a simplified AP architecture that provides wireless communication for one or more client devices. As shown, the access point 100 includes a processing component 101, a communication component 110, a number of ports 105, an antenna 115, a data buffer 120, and a power supply 125. The processing component 101 controls the operations of the wireless AP 100 and manages the processing of data traffic. The processing component 101 further comprises a processing core 130, a memory 135, an I/O controller 140, and a peripheral component interconnect express (PCIe) bus controller 125, all coupled to each other via bus 150. The memory 135 may include random access memory (RAM) and/or cache, and may include control logic (e.g., computer software) and/or data. In some embodiments, the processing component 101 may include more than one processing cores 130 to control the operations of the wireless AP 100, and more than one memory 135 storing the program instructions executed by the processing cores.

The processing component 101 is coupled to the data buffer 120, which is configured to temporarily store data sent from or addressed to a client device associated with the AP 100. Typically, the data is stored in the data buffer 120 in the order in which they were received from network or a client device. That is, as data (e.g., packets) arrives, it can be stored or placed into the data buffer 120. In one embodiment, the data buffer 120 is a first-in-first-out (FIFO) buffer that outputs data in the order that it was received/stored in the buffer 120. That is, the first data (e.g., the first packet) that is added to the FIFO buffer is also the first data that is processed or removed from the buffer. By using the FIFO buffer, the AP 100 may forward data to a receiving device (e.g., a station or another access point) in the same order that it was received by the AP 100. The receiving device may therefore process the data in the order it arrives, without resequencing it. In other embodiments, the data buffer 131 may be another type of data buffer, such as circular buffer, a last-in-first-out (LIFO) buffer, etc., to temporarily store data sent from or addressed to a client device associated with the AP 100.

The processing component 101 is coupled to the communication component 110, which is configured to perform various processing on signals that are received via the antenna 115. The antenna 115 on the AP 100 transmits and receives wireless signals, allowing the AP to connect to and/or provide wireless network. An AP may include one or more antennas, coupled to one or more radios configured for wireless communication.

The AP 100 also includes a power supply 125 providing power source for the AP to operate, and a number of ports 105, which may connect the AP 100 to a wired network.

Figure 2A:
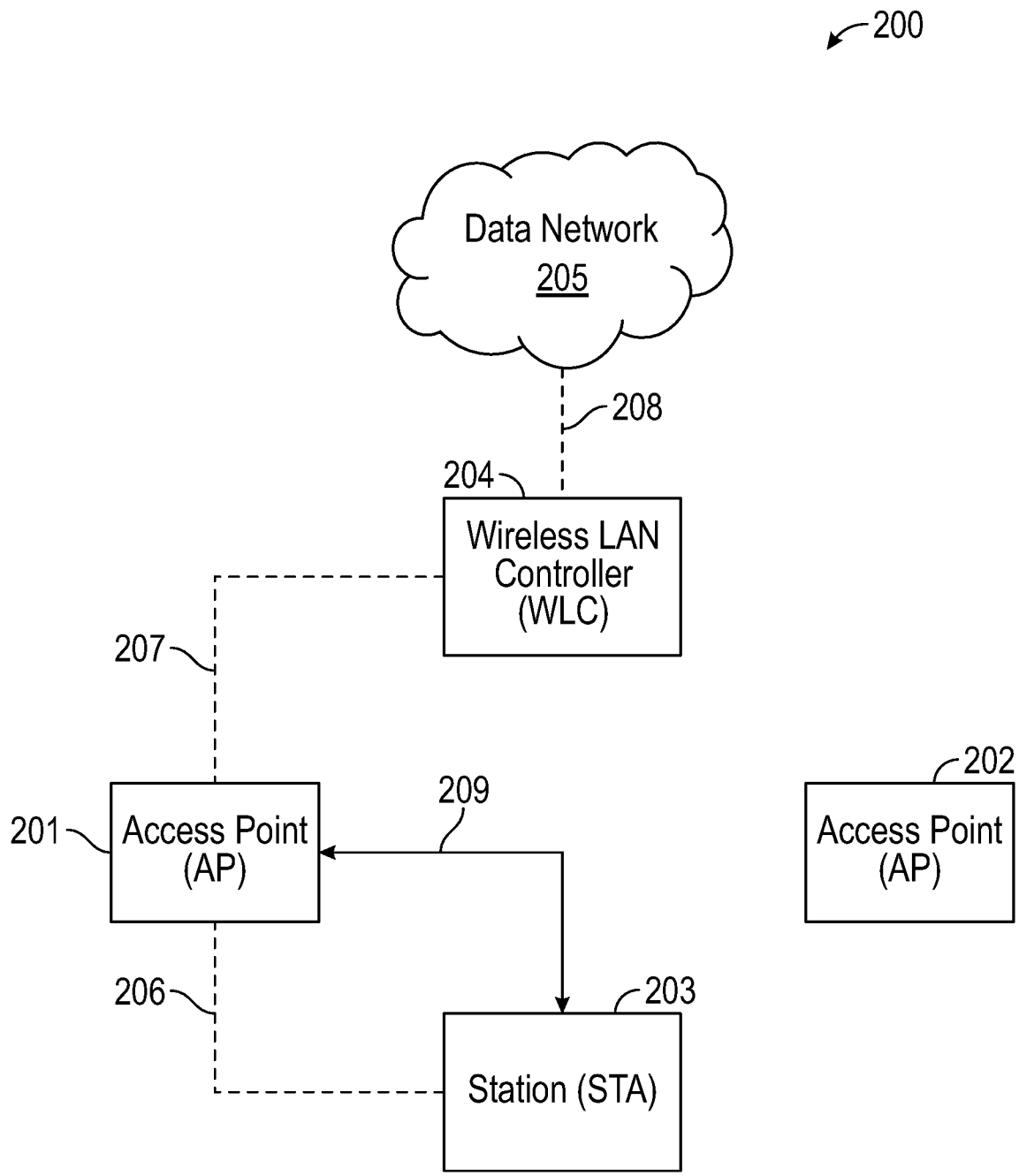
FIG. 2A depicts an example wireless communication network that provides optimized handovers, with a client device associated to a source AP, according to some embodiments of the present disclosure.
Figure 2B:
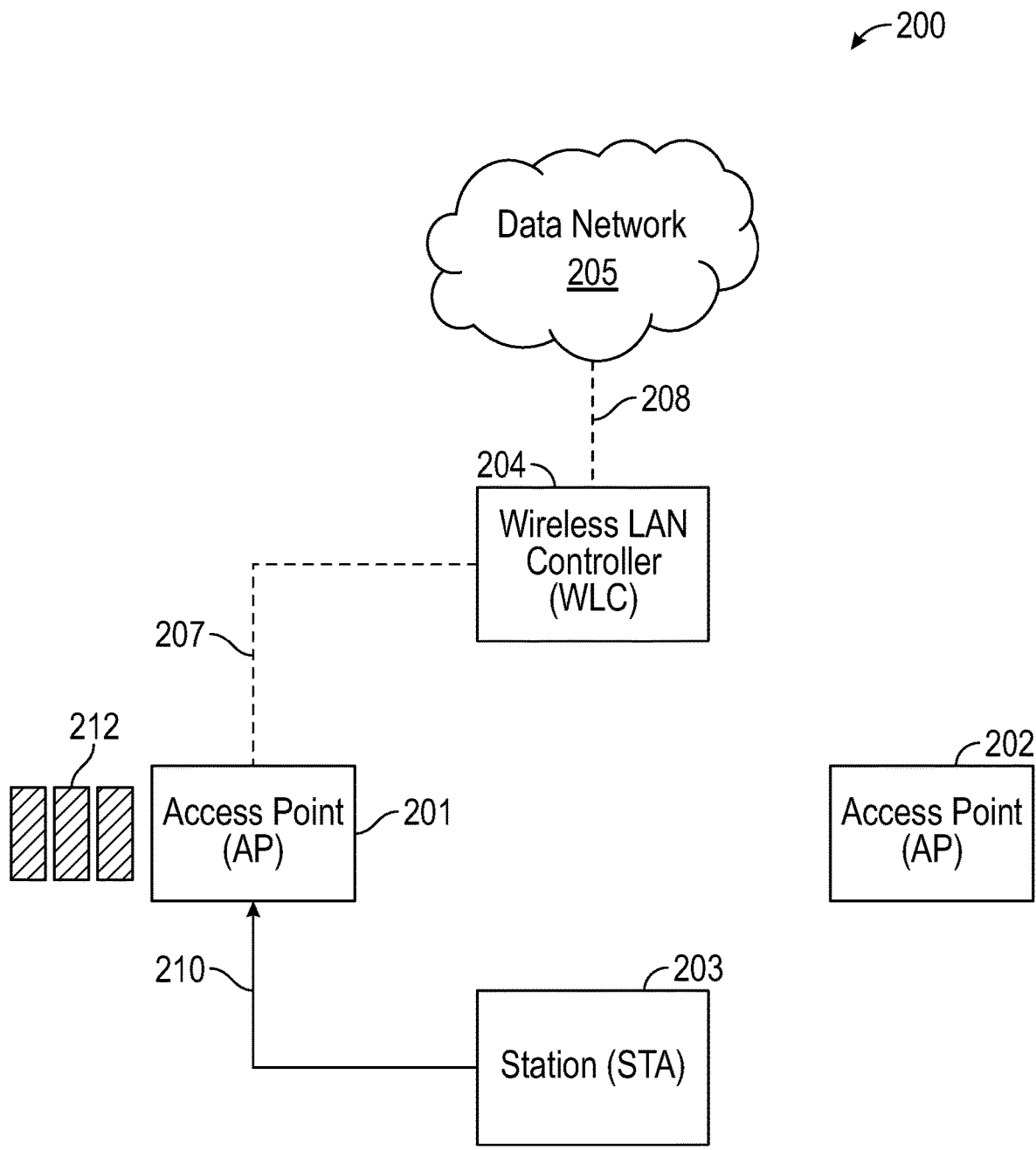
FIG. 2B depicts an example wireless communication network that provides optimized handovers, with the client device notifying the source AP of its upcoming departure, according to some embodiments of the present disclosure.
Figure 2C:
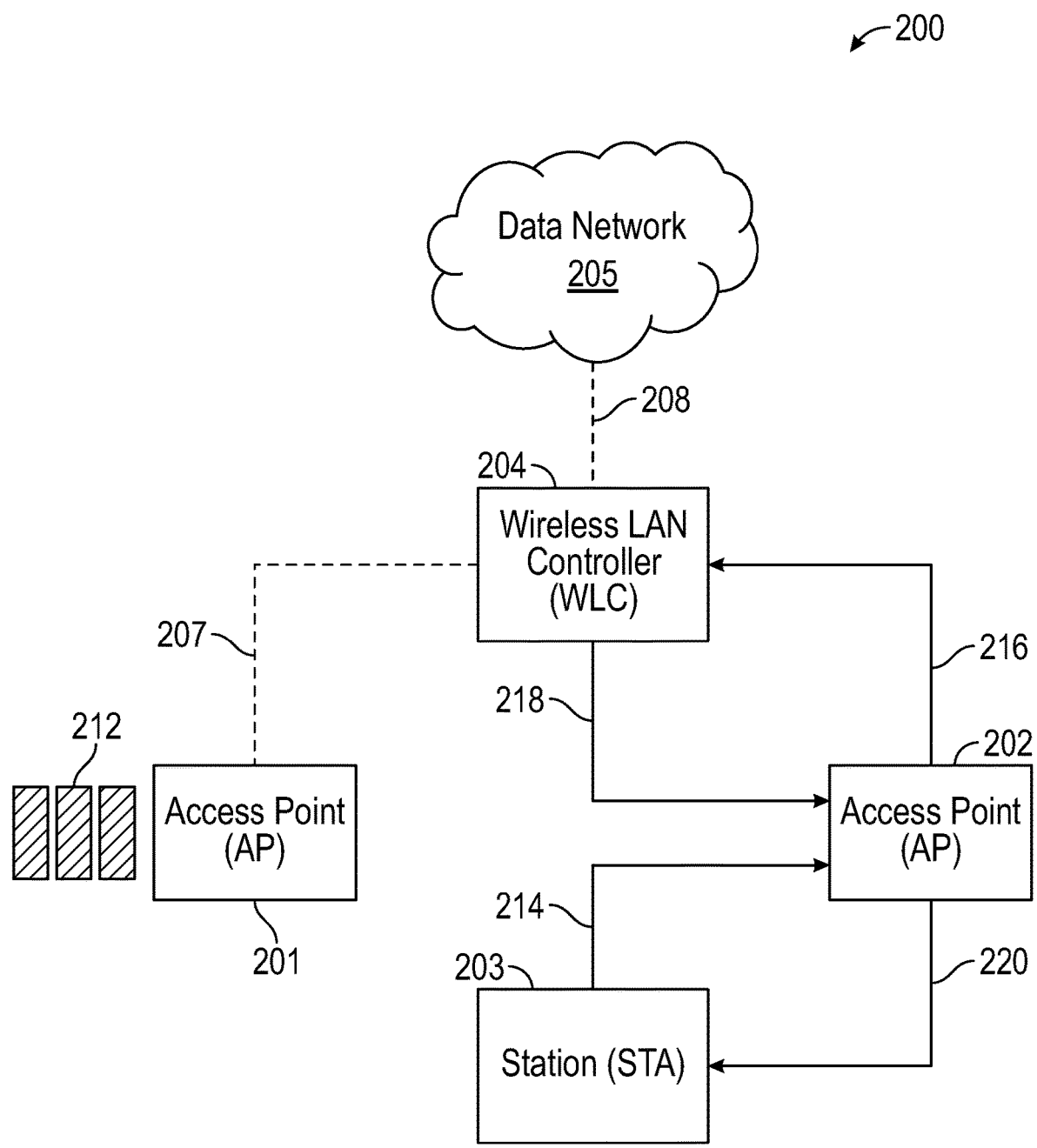
FIG. 2C depicts an example wireless communication network that provides optimized handovers, with the client device associated to a new AP, according to some embodiments of the present disclosure.
Figure 2D:
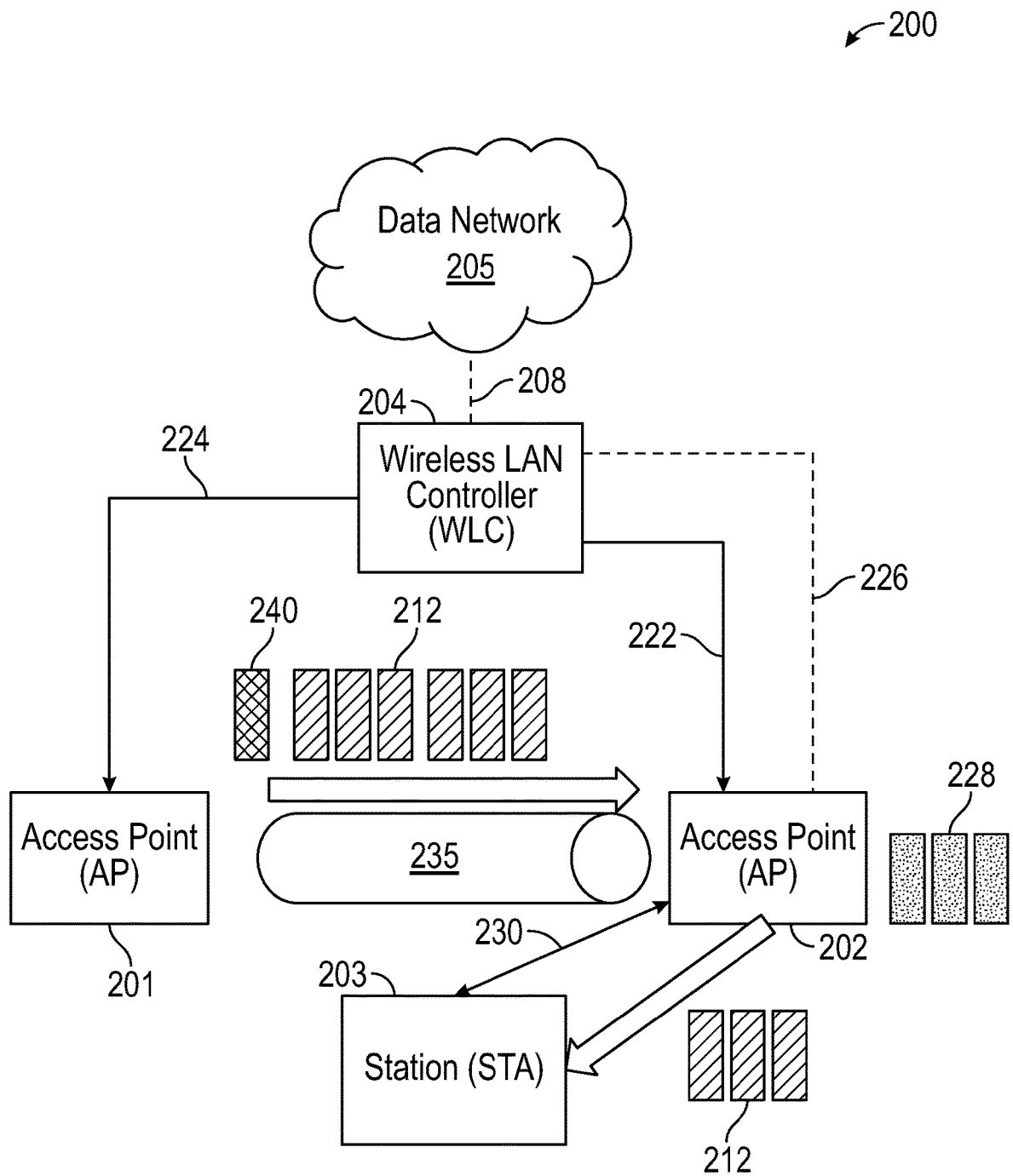
FIG. 2D depicts an example wireless communication network that provides optimized handovers, with the source AP transmitting its buffered data to the new AP, according to some embodiments of the present disclosure.

In the FIGS. 2A-2E, identical elements have been given the same reference number, e.g., Access Point 201 in FIGS. 2A-2E, buffered data 212 in FIGS. 2B-2D. In some embodiments, the FIGS. 2A-2E collectively depict a workflow for optimized handovers from a first AP to a second AP.

FIG. 2A depicts an example wireless communication network that provides optimized handovers, with a client device associated to a source AP, according to some embodiments of the present disclosure. As illustrated, the environment 200 includes a WLAN system (including a WLC 204, APs 201 and 202, and a station 203), and a broader data network 205 (e.g., the internet). The station (STA) 203 may correspond to a wireless client device that can communicate with an AP to access the WLAN network. A station can be any wireless-enabled device such as a laptop, smartphone, tablet, or other wireless device. In the figure, the STA 203 is associated with the AP 201 (as indicated by arrow 209), and the STA 203 is communicatively coupled with the data network 205 via data paths 206, 207, and 208. That is, the STA 203 may transmit data to the data network 205 (or devices connected to the data network 205) by transmitting data to AP 201 (via data path 206), through WLC 204 (via data path 207), and finally into the data network 205 (via data path 208). The STA 203 can similarly receive data from the data network 205 via data paths 206, 207, and 208.

In the illustrated example, the WLC 204 manages and controls the APs in the example WLAN system, including AP 201 and AP 202. For example, the WLC 204 may be configured to automatically handle the configuration of multiple wireless APs, and centralize wireless network infrastructure. Without a WLC, each AP may be configured and managed independently from other APs on the same network. By implementing a WLC to a wireless network, the deployment and administration of multiple APs can be centralized and simplified, which therefore improves the overall performance, security and scalability of the network.

In the illustrated example, downlink data addressed to STA 203 is first transmitted from data network 205, such as the internet, to the WLC 204 via data path 208. In some embodiments, the data comprises encapsulated packets with additional control information added by the sender device, such as source and destination network addresses, error detection codes, or sequencing information. The WLC then processes the data packets to determine to which AP the data should be forwarded (e.g., based on the destination address). Here, STA 203 is connected to AP 201, and therefore AP 201 can be selected by WLC 204 to receive the downlink data addressed to STA 203. As illustrated, the data packets are therefore forwarded from WLC 204 to AP 201 via data path 207. In some embodiments, the WLC 204 sends the packets to the AP 201 using a tunnel. That is, the WLC 204 may encapsulate the received packets and forward them to the AP 201 via a tunnel. Upon receiving the data packets, AP 201 checks the addressing information in the packets to determine that STA 203 is the intended recipient of the data. Based on this determination, the AP 201 can transmit the data packets to STA 203 via data path 206.

Similarly, in the illustrated example, the STA 203 can transmit uplink data to the broader data network 205 or another device in the WLAN system via the AP 201. Specifically, STA 203 may send the uplink data packets to the AP 201 via data path 206. The AP 201, upon receiving the packets, forwards them to the WLC 204 via data path 207. In some embodiment, the data packets are forwarded to WLC 204 using a tunnel. That is, AP 201 may encapsulate the uplink data with additional control or addressing information (e.g., the destination address), and forward them to the WLC 204 via a tunnel. Upon receiving the data packets, WLC 204 may perform several functions on the packets, such as security check or routing inspection, before transmitting them to the broader data network 205 (or devices connected to the data network 205), or another device in the WLAN system.

FIG. 2B depicts an example wireless communication network that provides optimized handover, with the client device notifying the source AP of its upcoming departure, according to some embodiments of the present disclosure. In the depicted example, STA 203 sends a disassociation notice (indicated by arrow 210) to AP 201, indicating its intents to terminate the association with AP 201. In some embodiments, the disassociation notice may further indicate that the STA 203 intends to associate/connect to a new AP (with or without specifically identifying the new AP). That is, rather than solely indicating an upcoming disassociation, the notice may indicate an upcoming roam event (which includes disassociation from the AP 201).

AP 201, upon receiving the disassociation notice 210, can stop forwarding data packets received from data network 205 to STA 203. That is, for any packets received (by the AP 201) from the data network 205 (or other components) and intended for the STA 203 (e.g., addressed to the STA 203), the AP 201 may refrain from forwarding the packets to the STA 203. As illustrated, rather than forwarding packets to STA 203, AP 201 buffers the data (e.g., depicted by buffered data 212) that is addressed to STA 203, until the data path for the STA 203 is switched (e.g., by WLC 204) from AP 201 to the target AP (e.g., AP 202).

In some embodiments, the AP 201 may use a separate buffer or partition for each roaming client device. That is, when a packet addressed to a currently roaming client is received, the AP 201 may identify the corresponding buffer (associated with the roam/client device), and buffer the packet in this buffer. In some embodiments, the AP 201 may use a shared buffer or partition for all roaming clients. For example, the AP may buffer all packets (addressed to roaming clients) in the same partition, selectively forwarding them based on their destination addresses, as discussed below in more detail.

In some embodiments, there are a variety of potential factors that may lead to the disassociation of STA 203 from AP 201, including (but not limited to) a decline in the signal strength between STA 203 and AP 201 below a predefined threshold, the STA 203 moving out of the range of AP 201 and into the range of AP 202, network congestion in AP 201 due to too many devices connected to it, or security concerns for STA 203 and/or AP 201.

In one embodiment, before sending the disassociation notice, STA 203 may first request, from AP 201, a neighbor report (e.g., under 802.11k) containing information about nearby available APs.

In some embodiments, Basic Service Set Transmission Management (BTM) services (e.g., introduced by 802.11v) can be implemented, where the STA 203 sends a BTM query frame to AP 201 for potential roaming candidates. In response to the BTM query frame, AP 201 transmits a BTM response frame to STA 203, where the response includes a list of roaming candidates, including AP 202. After receiving the list of roaming candidates, STA 203 may optionally send another BTM response frame to AP 201, informing the AP 201 as to whether it will stay or roam to a new AP. In some embodiments, if STA 203 decides to roam to another AP, it may send a BTM response frame to AP 201 with a status code of "accept." If STA 203 decides to stay on the current AP, it may send a BTM response frame to AP 201 with a status code of "reject" with or without reasons.

FIG. 2C depicts an example wireless communication network that provides optimized handovers, with the client device associated to a new AP, according to some embodiments of the present disclosure. In the depicted example, STA 203 sends an association request to AP 202 (as indicated by arrow 214), indicating its intent to associate with AP 202. AP 202, upon receiving the request, forwards the request to WLC 204 for authentication and authorization (as indicated by arrow 216). In an embodiment, the association request can contain a variety of information, such as the STA's capability data, the SSID of the network that the STA wishes to connect to, the transfer rate supported by the STA, the power for transmitting frames, the amount of time that the STA will wait before scanning for alternative APs, security-related data (e.g., desirable or supported authentication and encryption scheme to use, etc.), and the like. Upon receiving the association request, WLC 204 can check the parameters in the association request to determine whether these match the capacities of AP 202 and/or whether the STA 203 is (or can be) authenticated/permitted to associate. If the WLC 204 approves the association request, the WLC 204 can send an association response to AP 202 (as indicated by arrow 218), including an assigned Association ID for STA 203. AP 202 can then include the assigned Association ID in its own association response and sends it back to STA 203 (as indicated by arrow 220). After STA 203 receives the association response, STA 203 configures its connection to AP 202 based on the parameters included in the association response.

In the depicted example, the data path 207 remains to AP 201 during these association operations between STA 203 and AP 202 (as indicated by arrows 214-220). That is, the WLC 204 may not switch the data path from AP 201 to AP 202 until the association process between STA 203 and AP 202 is complete. In an embodiment, during these association operations (as indicated by arrows 214-220), data packets that are received from the broader data network 205 and addressed to STA 203 (e.g., depicted by buffered data 212) continue to be forwarded by WLC 204 to AP 201 via data path 207. AP 201 may store these packets in a data buffer (e.g. data buffer 120 of FIG. 1), until the STA 203 is fully associated to the AP 202.

FIG. 2D depicts an example wireless communication network that provides optimized handovers, with the source AP transmitting its buffered data to the new AP, according to some embodiments of the present disclosure. In the depicted example, the association process between STA 203 and AP 202 is complete and the STA 203 is fully associated to the AP 202 (as indicated by arrow 230). Further, as indicated by data path 226, the WLC 204 has switched the data path for the STA 203 from AP 201 to AP 202. As a result, AP 202 begins receiving downlink data that is received from the broader data network 205 and addressed to STA 203 via data paths 208 and 226. In the illustrated example, the WLC 204 can further send control messages 222 and 224 to AP 201 and AP 202, respectively. In the control message 224, WLC 204 can inform AP 201 that the STA 203 is now associated with AP 202. In some embodiments, this control message 224 serves to instruct AP 201 to send its buffered data 212 to AP 202 via a tunnel 235. Using the control message 222, WLC 204 can instruct or cause AP 202 to perform one or more operations, such as receiving the data 212 buffered by AP 201 (via tunnel 235), forwarding the buffered data 212 (received via the tunnel 235) to STA 203 as it arrives, and buffering the newly received data 228 (received by AP 202 from data network 205) in a data buffer of the AP 202 (e.g., data buffer 120 shown in FIG. 1). In some embodiments, the AP 202 can refrain from forwarding the buffered data 228 to STA 203 until the transmission of the buffered data 212 (from AP 201) to the STA 203 is complete, as discussed in more detail below.

In some embodiments, the AP 201 may indicate (to the AP 202) that the transmission of the buffered data 212 to the STA 203 is complete (e.g., no additional packets addressed to the STA 203 remain in the buffer on AP 201). For example, in the illustrated embodiment, following the last packet of buffered data 212, the AP 201 may transmit an end marker message 240 to AP 202 (via the tunnel 235), informing AP 202 that there is no remaining buffered data 212 at AP 201. Although the illustrated example depicts the end marker 240 as a discrete packet sent after the buffered data 212, in embodiments, the end marker 240 may be sent via other techniques, such as by including the end marker 240 as a flag or other indication in or with the last packet of buffered data 212 (e.g., in the header of the final packet), or as a separate packet/piece of data sent at any point after the buffered data 212 is sent (e.g., immediately after the last packet, a defined period of time after the last packet, and the like).

In the depicted example, data 212 may correspond to the data that is addressed to STA 203 and received by AP 201 before the data path is switched from AP 201 to AP 202, and data 228 may correspond to the data that is addressed to STA 203 and received by AP 202 after the data path is switched from AP 201 to AP 202. For conceptual clarity in the illustrated example, data 212 is indicated using cross hatching block, and data 228 is indicated using stippling.

In one embodiment, Control and Provisioning of Wireless Access Points (CAPWAP) protocol may be used for the transmission of control messages (e.g., control messages 222 and 224 of FIG. 2D) between WLC 204 and one or more APs (e.g., APs 201 and 202 of FIG. 2A-2E). In some embodiments, Lightweight Access Point Protocol (LWAPP) protocol may be used for the transmission of control message between WLC 204 and one or more APs. Other protocols may also be used for the transmission of control message between WLCs and APs, depending on the specific network configuration and requirements.

In one embodiment, the tunnel 235 is a layer 3 tunnel that operates at the network layer of the Open Systems Interconnection (OSI) model. The tunnel 235 may use a variety of network layer tunneling protocols, such as Internet Protocol Security (IPSec), or the Virtual Extensible LAN (VxLAN) protocol. In some embodiments, the tunnel 235 further implements QUIC (Quick UDP Internet Connections) protocol to provide end-to-end communication services. In some embodiments, the data frames transmitted between AP 201 and AP 202 are encapsulated by a VxLAN protocol in layer 3 UDP packets (e.g., adding a VxLAN header that contains the VNI to the frame), which can enable layer 2 frames to be routed over the layer 3 tunnel.

In one embodiment, the tunnel 235 is a pre-existing tunnel. That is, the tunnel 235 may be created between AP 201 and AP 202 before the handover process starts. This may allow the tunnel 235 to be used for a variety of data exchanges between AP 201 and AP 202, such as for exchanging control or informational messages, exchanging packets during handovers between the APs, and the like. In some embodiments, the tunnel 235 is established in response to an instruction from the WLC 204 (e.g., in response to the control messages 224 and 222 sent by WLC 204), after the STA 203 has begun the handover from the AP 201 to the AP 202.

Figure 2E:
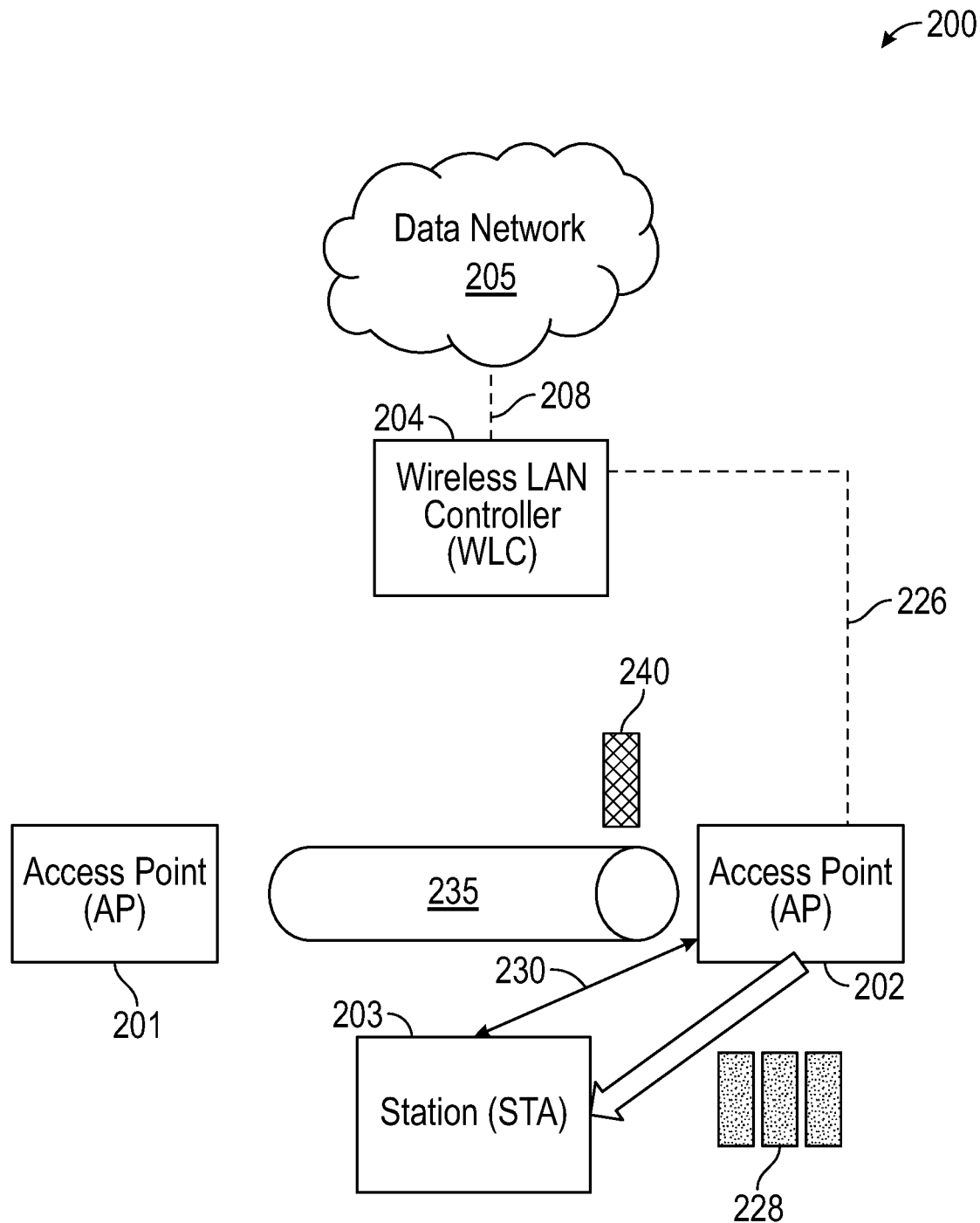
FIG. 2E depicts an example wireless communication network that provides optimized handovers, with the new AP transmitting its buffered data to the client device, according to some embodiments of the present disclosure.

FIG. 2E depicts an example wireless communication network that provides optimized handovers, with the new AP transmitting its buffered data to the client device, according to some embodiments of the present disclosure. In the illustrated example, STA 203 is associated with AP 202 (as indicated by arrow 230), and AP 202 receives an end marker message 240 from AP 201 via the tunnel 235, indicating that no additional packets addressed to the STA 203 remain in the buffer on AP 201. AP 202, upon receiving the end marker message 240, may begin transmitting its buffered data 228 to STA 203 (after the last packet of buffered data 212 has been forwarded). As discussed above, the data 228 may correspond to the downlink data from data network 205 that is addressed to STA 203 (which was received after the data path was switched from AP 201 to AP 202), which AP 202 buffers until the buffered data 212 from AP 201 has been fully transmitted to the STA 203.

Figure 3:
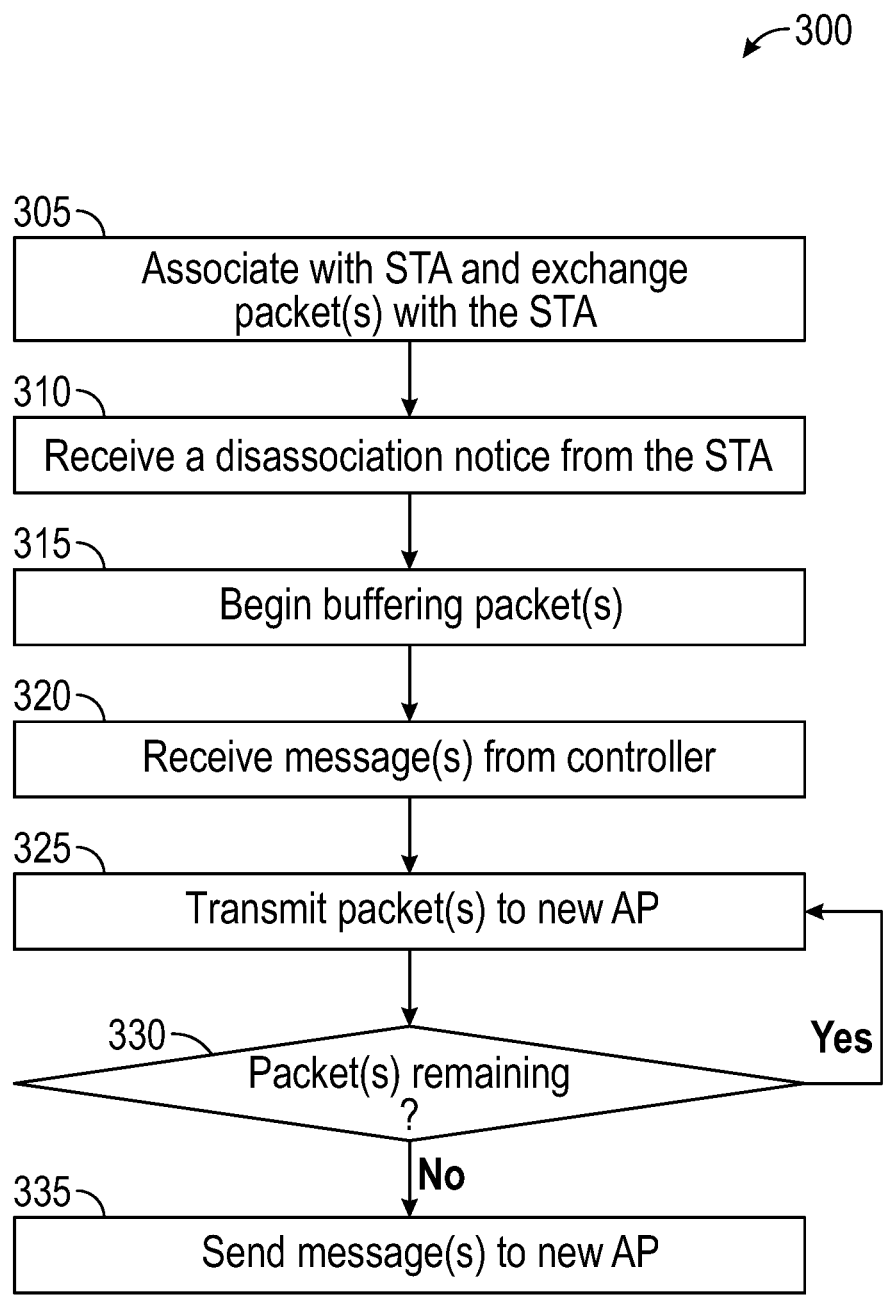
FIG. 3 is a flow diagram depicting an example method for operations performed by a source AP to enable an optimized handover, according to some embodiments of the present disclosure.

FIG. 3 is a flow diagram depicting an example method for operations performed by a source AP to enable an optimized handover, according to some embodiments of the present disclosure. In some embodiments, the method 300 is performed by an access point, such as AP 201 of FIG. 2A-2E. In at least one embodiment, the method 300 is performed by the first, origin, or source AP involved in a handover/roam event (e.g., the AP to which the client device is associated prior to the roam).

At block 305, the AP associates with a client device (or is already associated to the device), and transmits and receives data packets to and from the client device. That is, the client device can transmit and receive data packets (e.g., to a broader network and/or to other devices) via the AP. As discussed above, the client device can be any wireless-enabled device, such as STA 203 in FIG. 2A-2E.

At block 310, the AP receives a disassociation notice from the client device, informing the AP that the client device is preparing to disassociate from the AP. For example, before sending the disassociation notice, the client device may, as discussed above, request a neighbor report from the AP to determine if it should stay or roam to a new AP, or may identify a neighbor/new AP based on broadcast beacons from the new AP.

At block 315, in response to the disassociation notice, the AP begins buffering data packets received for the client device (e.g., intended for or addressed to the client device). For example, as discussed above, the data packets received for the client device may be transmitted by a wireless controller from a data network. As discussed above, the data packets may be stored in the data buffer of the AP in the order in which they arrived (e.g., using a FIFO buffer).

At block 320, the AP receives a message from a wireless controller, such as WLC 204 in FIG. 2A-2E. The message indicates that the client device is associated with a new AP, such as AP 202 of FIG. 2A-2E, and may cause the AP to transmit its buffered data packets (that are addressed to the client device) to the new AP via a tunnel connecting the two APs. In one embodiment, as discussed above, CAPWAP protocol is used for the transmission of the message.

At block 325, in response to the message, the AP begins transmitting its buffered data packets (addressed to the client device) to the new AP via the tunnel connecting the two APs. In some embodiments, as discussed above, the tunnel may be a layer 3 tunnel that operates at the network layer of OSI model. In some embodiments, as discussed above, the tunnel may be a pre-existing tunnel that is created before the AP receiving the disassociation notice (e.g., a tunnel that can be used to perform packet forwarding for any handovers between the APs). In some embodiments, as discussed above, the tunnel may be established in response to the message from the controller (during the current handover), after the client device has been associated with the new AP.

At block 330, the AP checks its data buffer and determines if all buffered packets (e.g., all packets that are addressed to the client device) have been transmitted to the new AP. If, at block 330, the AP determines that there are no remaining packets in its data buffer, such as data buffer 120 in FIG. 1, the method 600 proceeds to block 335, where the AP sends an end marker message to the new AP via the tunnel, indicating the transmission is complete.

If, at block 330, the AP determines that there are packets remaining at its data buffer-data packets that have not been forwarded to the new AP, the method moves to block 325, where the AP continues transmitting its buffered packets to the new AP via the tunnel.

Figure 4:
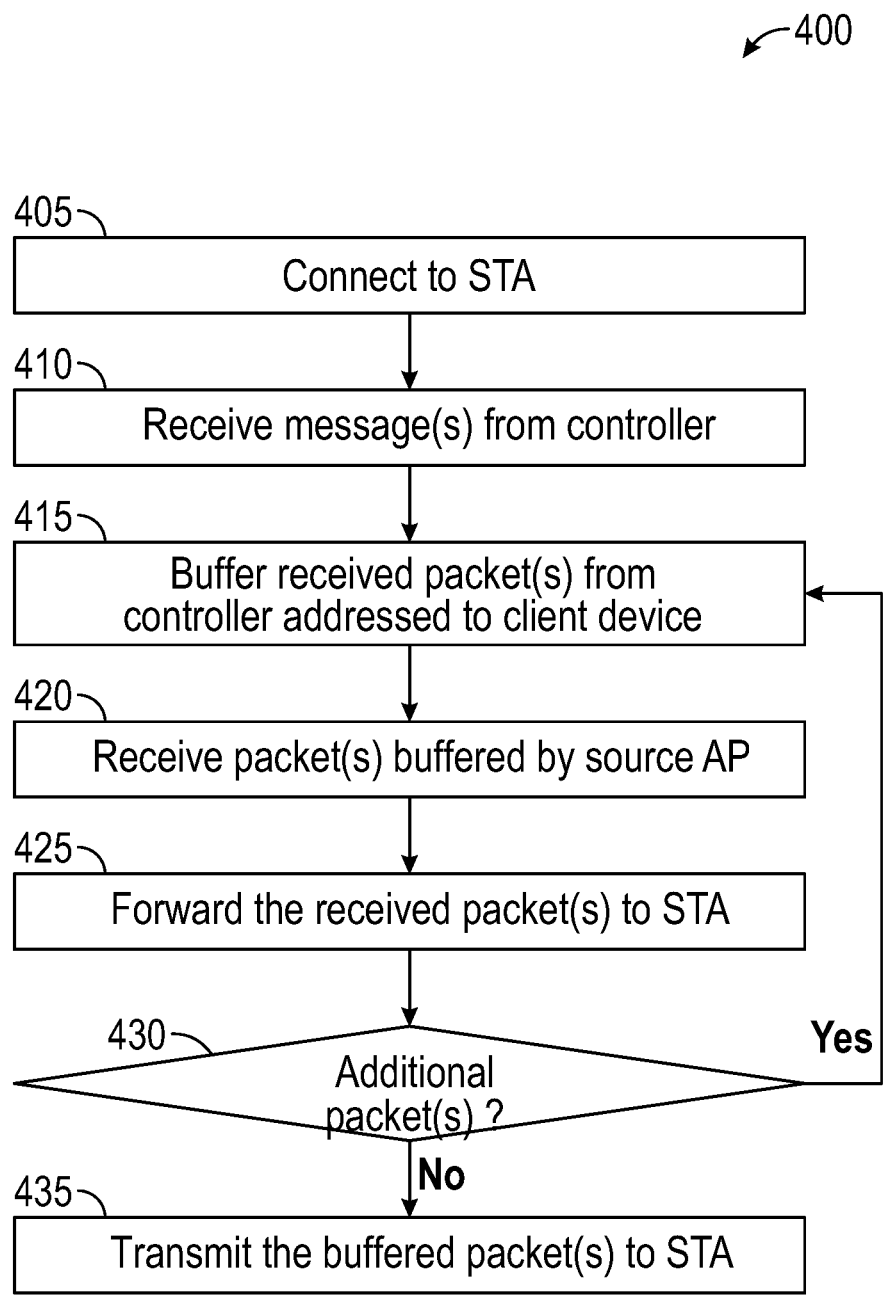
FIG. 4 is a flow diagram depicting an example method for operations performed by a new AP to enable an optimized handover, according to some embodiments of the present disclosure.

FIG. 4 is a flow diagram depicting an example method 400 for operations performed by a new AP to enable an optimized handover, according to some embodiments of the present disclosure. In some embodiments, the method 400 is performed by an access point, such as AP 202 of FIG. 2A-2E. In at least one embodiment, the method 400 is performed by the target, destination, or new AP involved in a handover/roam event (e.g., the AP to which the client device roams).

At block 405, the AP connects to the client device. For example, as discussed above, the AP may undergo an association procedure to establish the new connection. In some embodiments, as discussed above, this association process can include exchanging one or more messages with a wireless controller (e.g., WLC 204 of FIGS. 2A-2E) to authenticate and associate the client device to the new AP.

At block 410, the AP receives a message from a wireless controller, instructing it to buffer data received for/addressed to the client device. In response to the message, at block 415, the AP begins buffering data packets that were received from a controller and addressed to client device (e.g., buffered data 228 of FIG. 2D-2E). For example, as discussed above, the data packets received for the client device may be transmitted by the wireless controller from a data network. As discussed above, the data packets may be stored in the data buffer of the AP in the order in which they arrived (e.g., using a FIFO buffer).

At block 420, the AP receives the data packets buffered by the source AP (e.g., buffered data 212 of FIG. 2D-2E) via a tunnel connecting the two APs. In some embodiments, as discussed above, the tunnel may be a layer 3 tunnel that operates at the network layer of OSI model. In some embodiments, as discussed above, the tunnel may be a pre-existing tunnel that is created before the AP receiving the disassociation notice (e.g., a tunnel that can be used to perform packet forwarding for any handovers between the APs). In some embodiments, as discussed above, the tunnel may be established in response to the message from the controller (during the current handover), after the client device has been associated with the new AP.

At block 425, the AP forwards the received data packets (e.g., buffered data 212 of FIG. 2B-2D) to the client device as they arrived. At block 430, the AP determines whether there is additional packet buffered by the source AP (addressed to the client device) waiting to be transmitted. For example, the AP may determine whether the source AP has indicated that no additional packets remain (e.g., by transmitting an end marker) and/or whether the source AP has indicated that at least one additional packet remains (e.g., by transmitting an indication that more packets are expected). In at least one embodiment, the AP may determine whether additional packets remain based on whether a defined period of time has elapsed since the last packet arrived from the source AP. For example, the AP may determine whether a defined length of time (e.g., one second) has elapsed since the last packet was received.

If, at block 425, the AP determines there is additional packet waiting to be transmitted from the source AP (e.g., packets of buffered data 212 have been fully forwarded to the AP), the method proceeds to block 415, where the AP continues buffering the received packets from controllers addressed to client device (e.g., buffered data 228 of FIG. 2D-2E).

If, at block 425, the AP determines no additional packet is waiting to be transmitted from the source AP (e.g., the last packet of buffered data 212 has been forwarded to the AP), the method moves to block 435, where the AP begins transmitting its buffered data (e.g., buffered data 228 of FIG. 2D-2E) to client device.

Figure 5:
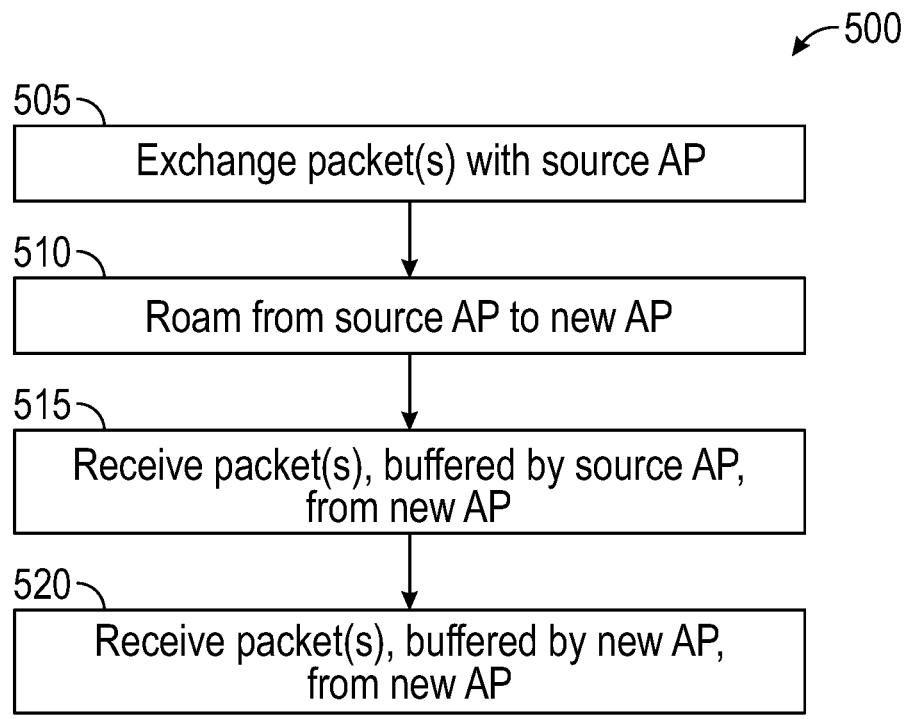
FIG. 5 is a flow diagram depicting an example method for operations performed by a client device to enable an optimized handover, according to some embodiments of the present disclosure.

FIG. 5 is a flow diagram depicting an example method 500 for operations performed by a client device to enable an optimized handover, according to some embodiments of the present disclosure. In some embodiments, the method 500 is performed by a non-AP client device, such as STA 203 of FIG. 2A-2E. The non-AP client device can be any type of device that can connect to a WLAN system and access its resources, including traditional computing devices such as laptops, desktops, tablets, and smartphones, as well as a growing number of Internet of Things (IoT) devices such as smart home devices, fitness trackers, and industrial sensors, etc.

At block 505, the client device is associated with the source AP, such as AP 201 of FIG. 2A-2E, and transmits and receives data packets through the source AP. At block 510, the client device roams from the source AP to a new AP, such as AP 202 of FIG. 2A-2E. For example, as discussed above, the client device may undergo an association procedure to establish the new connection. The client device may send a disassociation notice to the source AP, indicating its intent to leave. In some embodiments, the client device may send an association request to the new AP, indicating its intent to associate with the new AP. In some embodiments, this association request may be forwarded by the new AP to a wireless controller, which can determine if the new AP has sufficient capacity/capability to accommodate the new connection and/or whether the client device is or can be authenticated. Once the wireless controller approves the request, it may send an association response to the client device via the new AP, which may include an assigned Association ID for the client device.

At block 515, the client device begins receiving packets buffered by the source AP (e.g., buffered data 212 of FIG. 2B-2D) via the new AP. That is, as discussed above, the source AP may forward its buffered packets (addressed to the client device) to the new AP, which forwards them to the client device.

At block 520, the transmission of packets buffered by the source AP is complete, and the client device begins receiving packets buffered by the new AP (e.g., buffered data 228 of FIG. 2D-2E) from the new AP.

Figure 6:
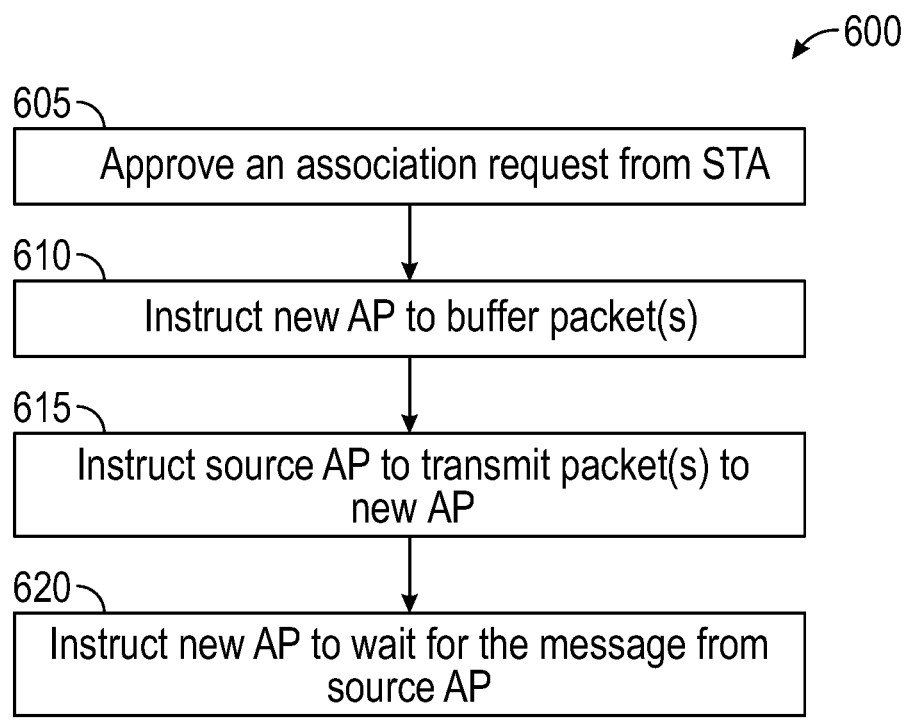
FIG. 6 is a flow diagram depicting an example method for operations performed by a controller to enable an optimized handover, according to some embodiments of the present disclosure.

FIG. 6 is a flow diagram depicting an example method for operations performed by a controller to enable an optimized handover, according to some embodiments of the present disclosure. In some embodiments, the method 600 is performed by a wireless controller, such as WLC 204 of FIG. 2A-2E.

At block 605, the wireless controller receives an association request (transmitted by a client device, such as STA 203 of FIG. 2A-2E) and forwarded by a new AP. As discussed above, the association request can generally indicate that the client device intends to associate with the new AP, such as AP 202 of FIG. 2A-2E. For example, as discussed above, the association request may contain a variety of information, such as the client device's capability, the SSID that the client device intends to join, the transfer rate supported by the client device, the power for transmitting frames, the amount of time the client device will wait before scanning for alternative APs, security-related data, and the like. In an embodiment, the wireless controller can check the parameters in the association request, and approves the request if it determines that the new AP has sufficient capacity and resource to accommodate the new client device and/or that the client device is authenticated/allowed to associate to the new AP.

At block 610, when the client device associates with the new AP, the data path is switched from the source AP to the new AP. The wireless controller therefore instructs the new AP to begin buffering data it receives from the network without forwarding them directly to the client device. That is, the controller instructs or causes the new AP to refrain from forwarding packets it receives (from the controller) to the client device, and instead to buffer them.

At block 615, the wireless controller sends a message to the source AP, instructing the source AP to transmit its buffered data packets to the new AP. In some embodiments, the wireless controller also requests the source AP to send an end marker message to the new AP once the transmission is complete. In some embodiments, as discussed above, CAP-WAP protocol may be used for the transmission of the message. In some embodiments, as discussed above, the buffered data packets may be transmitted via a pre-existing tunnel connecting the two APs. In some embodiments, as discussed above, the message may include the new AP's IP address, and may cause the source AP to build a new tunnel towards the new AP.

At block 620, the wireless controller sends a message to the new AP, instructing the new AP to wait to receive an end marker message from the source AP before transmitting its buffered data packets to the client device. In some embodiments, as discussed above, CAPWAP protocol may be used for the transmission of the message. In some embodiments, as discussed above, the end marker message may be transmitted via a pre-existing tunnel connecting the two APs. In some embodiments, as discussed above, the message may include the source AP's IP address, and may cause the new AP to build a new tunnel towards the source AP.

Figure 7:
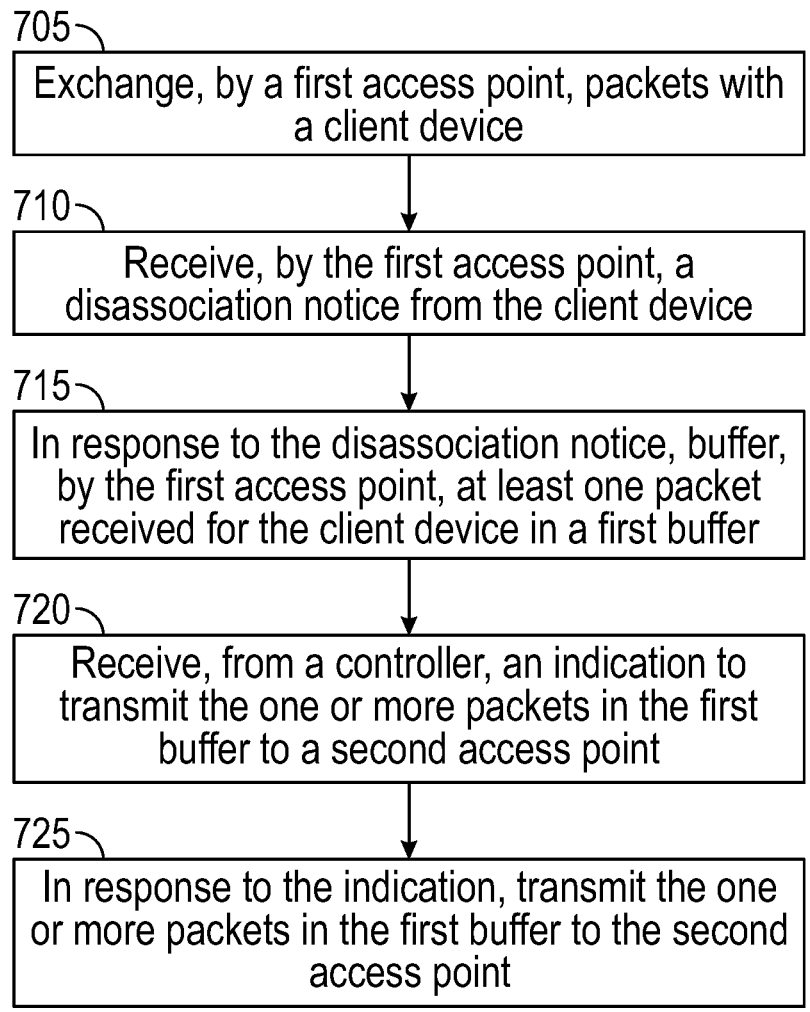
FIG. 7 is a flow diagram depicting an example method for improved handover operations performed by a source AP, according to some embodiments of the present disclosure.

FIG. 7 a flow diagram depicting an example method for improved handover operations performed by a source AP, according to some embodiments of the present disclosure.

At block 705, a first AP (e.g., AP 201 of FIG. 2A-2E) exchanges packets with a client device (e.g., STA 203 of FIG. 2A-2E).

At block 710, the first AP receives a disassociation notice (e.g., 210 of FIG. 2B) from the client device.

At block 715, in response to the disassociation notice, the first AP buffers at least one packet received for the client device (e.g., buffered data 212 of FIG. 2B-2D) in a first buffer (e.g., data buffer 120 of FIG. 1).

At block 720, the first AP receives, from a controller (e.g., WLC 204 of FIG. 2A-2E), an indication (e.g., message 224 of FIG. 2D) to transmit the one or more packets (e.g., buffered data 212 of FIG. 2B-2D) in the first buffer to a second AP (e.g., AP 202 of FIG. 2A-2E).

At block 725, in response to the indication, the first AP transmits the one or more packets (e.g., buffered data 212 of FIG. 2B-2D) in the first buffer to the second AP. In one embodiment, as discussed above, the one or more packets (e.g., buffered data 212 of FIG. 2B-2D) in the first buffer is encapsulated and transmitted via a tunnel between the first AP and the second AP.

In some embodiments, as discussed above, the tunnel may be a pre-existing tunnel that was created prior to receiving the disassociation notice (e.g., 210 of FIG. 2B). In some embodiments, the tunnel may be established subsequent to receiving the indication (e.g., 224 of FIG. 2D) from the controller. In some embodiments, the first AP may check its first buffer and determines if any packet (e.g., buffered data 212 of FIG. 2B-2D) remains in the first buffer. Upon determining that no more packets remain in the first access point, the first AP may transmit, to the second AP, an indication that no additional packets remain in the first buffer (e.g., message 240 of FIG. 2E).

Figure 8:
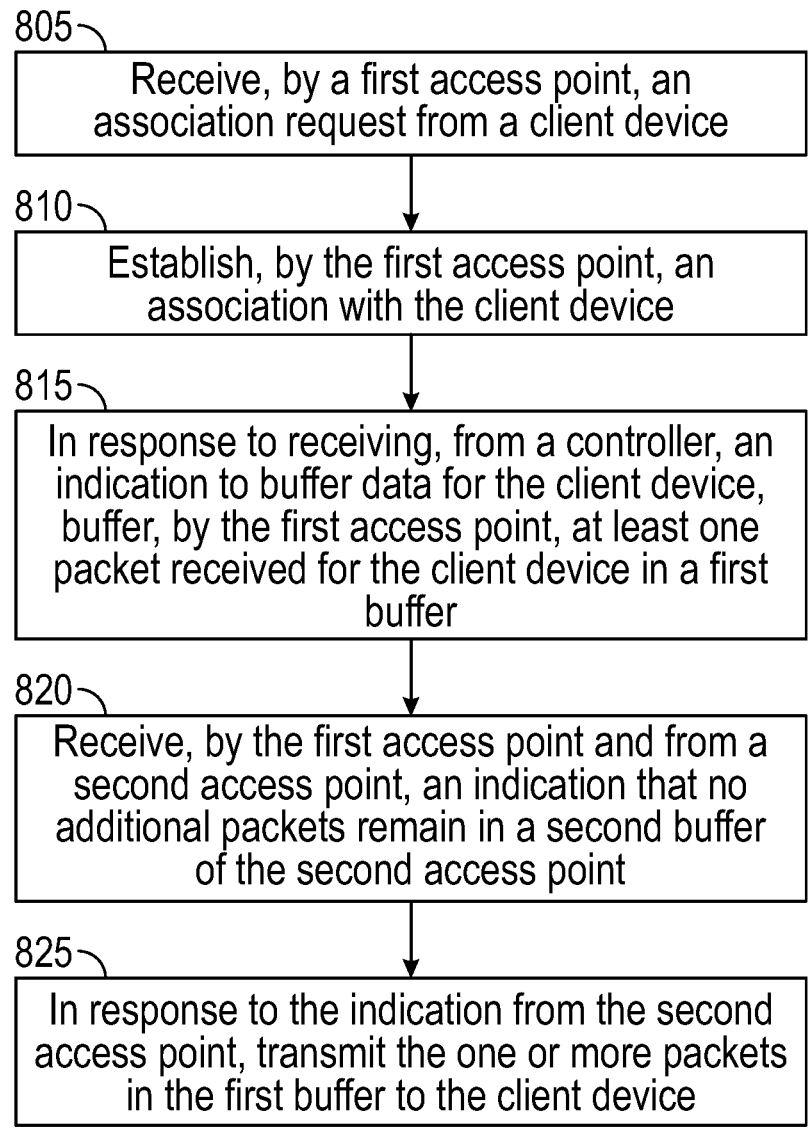
FIG. 8 is a flow diagram depicting an example method for improved handover operations performed by a new AP, according to some embodiments of the present disclosure.

FIG. 8 a flow diagram depicting an example method for improved handover operations performed by a new AP, according to some embodiments of the present disclosure.

At block 805, a first AP (e.g., AP 202 of FIG. 2A-2E) receives an association request (e.g., 214 of FIG. 2C) from a client device (e.g., STA 203 of FIG. 2A-2E).

At block 810, the first AP establishes an association with the client device (e.g., 230 of FIGS. 2D and 2E).

At block 815, the first AP receives, from a controller (e.g., WLC 204 of FIG. 2A-2E), an indication (e.g., message 221 of FIG. 2D) to buffer data for the client device, and in response to the indication, the first AP buffers at least one packet received for the client device (e.g., buffered data 228 of FIGS. 2D and 2E) in a first buffer (e.g., data buffer 120 of FIG. 1).

At block 820, the first AP receives an indication (e.g., message 240 of FIG. 2E) from a second AP (e.g., AP 201 of FIG. 2A-2E) that no additional packets (e.g., buffered data 212 of FIG. 2B-2D) remain in a second buffer of the second AP.

In some embodiments, as discussed above, prior to receiving the indication that no additional packets remain in the second buffer, the first AP may continue receiving one or more packets (e.g., buffered data 212 of FIG. 2B-2D) from the second buffer, and transmitting the one or more packets (e.g., buffered data 212 of FIG. 2B-2D) from the second buffer to the client device.

In some embodiments, as discussed above, the indication that no additional packets remain in the second buffer may be received via a tunnel between the first AP and the second AP. In some embodiments, as discussed above, the tunnel is a pre-existing tunnel that was created prior to receiving the association request (e.g., 214 of FIG. 2B). In some embodiments, the tunnel is established subsequent to receiving the indication to buffer data for the client device (e.g., 222 of FIG. 2D) from the controller.

At block 825, in response to the indication (e.g., message 240 of FIG. 2E) from the second AP, the first AP transmits the one or more packets (e.g., buffered data 228 of FIGS. 2D and 2E) in the first buffer to the client device.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
exchanging, by a first access point, packets with a client device;
receiving, by the first access point, a disassociation notice from the client device;
in response to the disassociation notice, buffering, by the first access point, one or more packets received for the client device in a first buffer;
receiving, from a controller, an indication to transmit the one or more packets in the first buffer to a second access point; and
in response to the indication, transmitting the one or more packets in the first buffer to the second access point, wherein, in response to the client device associating with the second access point, the second access point buffers at least one packet received for the client device in a second buffer.

2. The method of claim 1, wherein transmitting the one or more packets in the first buffer further comprises encapsulating and transmitting the packets via a tunnel between the first access point and the second access point.

3. The method of claim 2, wherein the tunnel between the first access point and the second access point is a pre-existing tunnel that was created prior to receiving the disassociation notice.

4. The method of claim 2, wherein the tunnel between the first access point and the second access point was dynamically established subsequent to receiving the indication from the controller.

5. The method of claim 1, further comprising upon determining that no more packets remain in the first access point, transmitting, to the second access point, an indication that no additional packets remain in the first buffer.

6. The method of claim 1, wherein the second access point transmits the one or more packets in the first buffer received from the first access point to the client device.

7. The method of claim 6, wherein upon receiving, from the first access point, an indication that no additional packets remain in the first buffer, the second access point transmits the one or more packets in the second buffer to the client device.

8. A method, comprising:
receiving, by a first access point, an association request from a client device;
establishing, by the first access point, an association with the client device;
in response to receiving, from a controller, an indication to buffer data for the client device, buffering, by the first access point, one or more packets received for the client device in a first buffer;
receiving, by the first access point and from a second access point, an indication that no additional packets remain in a second buffer of the second access point; and
in response to the indication from the second access point, transmitting the one or more packets in the first buffer to the client device.

9. The method of claim 8, further comprising:
prior to receiving the indication that no additional packets remain in the second buffer, receiving, from the second access point, one or more packets from the second buffer; and
transmitting the one or more packets from the second buffer to the client device.

10. The method of claim 8, wherein the indication that no additional packets remain in the second buffer is received via a tunnel between the first access point and the second access point.

11. The method of claim 10, wherein the tunnel between the first access point and the second access point is a pre-existing tunnel that was created prior to receiving the association request.

12. The method of claim 10, wherein the tunnel between the first access point and the second access point was established subsequent to receiving, from the controller, the indication to buffer data for the client device.

13. The method of claim 8, wherein the first access point buffers at least one packet received for the client device in the second buffer upon receiving a disassociation notice from the client device.

14. A non-transitory computer-readable medium containing computer program code that, when executed by operation of one or more computer processors, performs an operation comprising:
receiving, by a first access point, an association request from a client device;
establishing, by the first access point, an association with the client device;
in response to receiving, from a controller, an indication to buffer data for the client device, buffering, by the first access point, one or more packets received for the client device in a first buffer;
receiving, by the first access point and from a second access point, an indication that no additional packets remain in a second buffer of the second access point; and
in response to the indication from the second access point, transmitting the one or more packets in the first buffer to the client device.

15. The non-transitory computer-readable medium of claim 14, further comprising:
prior to receiving the indication that no additional packets remain in the second buffer, receiving, from the second access point, one or more packets from the second buffer; and
transmitting the one or more packets from the second buffer to the client device.

16. The non-transitory computer-readable medium of claim 14, wherein the indication that no additional packets remain in the second buffer is received via a tunnel between the first access point and the second access point.

17. The non-transitory computer-readable medium of claim 16, wherein the tunnel between the first access point and the second access point is a pre-existing tunnel that was created prior to receiving the association request.

18. The non-transitory computer-readable medium of claim 16, wherein the tunnel between the first access point and the second access point was established subsequent to receiving, from the controller, the indication to buffer data for the client device.

19. The non-transitory computer-readable medium of claim 14, wherein the first access point buffers at least one packet received for the client device in the second buffer upon receiving a disassociation notice from the client device.

* * * * *